UNITED STATES PATENT OFFICE.

DOMINGO LODIGIANI, OF MEXICO, MEXICO.

PROCESS OF OBTAINING STRONG AQUEOUS SOLUTIONS OF CREOSOTE.

No. 915,977.  Specification of Letters Patent.  Patented March 23, 1909.

Application filed November 16, 1908. Serial No. 462,962.

*To all whom it may concern:*

Be it known that I, DOMINGO LODIGIANI, a subject of the King of Italy, residing at Mexico city, Federal District, Mexico, have invented certain new and useful Improvements in Processes of Obtaining Strong Aqueous Solutions of Creosote; and I do hereby declare the following to be a full, clear, and exact description of the invention, such as will enable others skilled in the art to which it appertains to make and use the same.

My invention aims to produce relatively very strong solutions of creosote in water as compared to any thus far obtainable in the arts. Such solutions constitute in themselves, and mixed with suitable medicaments, remedial agents especially valuable in bronchial and pulmonary affections, such as phthisis, pulmonic catarrh, chronic non-tubercular inflammation of the bronchial tubes and of the lung structure itself when the affection is not of the catarrhal type. This remedy is also valuable in treating the many other ailments which experience has shown to be responsive to creosote such as nausea, vomiting and diarrhea, cholera morbus, cholera infantum, typhoid fever and dysentery.

Since its discovery creosote has been recognized as an invaluable agent of *materia medica*, but its use has been largely restricted by the heretofore existing impossibility of dissolving it to any pharmaceutically useful extent in water. As the crude creosote irritates and even destroys tissue with which it is brought into direct contact, having a decided caustic effect, it has been administered in cod liver oil or emulsions and in capsules containing from 3 to 5 minims, which was the maximum dose the stomach could bear. (*Dispensatory of the U. S.*, H. C. Woods, 1899 edition.) The same authority states that at 15° C. it was possible to dissolve one part of creosote in 150 parts of water, but that this was an imperfect solution being turbid owing to the presence of oily drops. On the other hand authorities such as Déjardin, Beaumetz, Yvon and Gastellon, place the strongest attainable pure solution of creosote in water at from 0.286% to 0.25%. By the process hereinafter described I readily obtain aqueous solutions containing from 10% to 12% of creosote, which, in combination with the suitable chemicals, permit doses of as high as 6 to 8 grams of creosote as compared with the former 3 to 5 minims (1.9 to 3.1 grams) to be administered without any local injury or derangement of the stomach, the creosote losing entirely its caustic character in the process, while preserving unchanged its therapeutic properties.

I obtain aqueous solutions of the strength above mentioned by the following process, in which the quantities of ingredients used are not to be considered otherwise than as indicating the preferable relative proportions. In a suitable glass vessel or bottle, 100 grams of creosote, preferably beech-wood creosote, 100 grams of pure glycerin and 20 grams of absolute alcohol are thoroughly commingled by shaking up together. This mixture is gradually poured into a glass mortar upon 20 grams of finely triturated carbonate of magnesia, under constant agitation of the mortar and its contents, causing it to become thoroughly emulsified. Under constant stirring and agitation there are gradually added to said emulsion 700 grams of syrup, being a solution of sugar in water at a strength of 20 degrees of the standard Baumé saccharimeter. The agitation is continued for a short time, not less than ten minutes, after the whole of the syrup has been added to the emulsion whereupon a complete solution of the creosote in sugar water will have been obtained, which with the ingredients used in the given proportions, will be of a strength approximately equal to 11%. This completes the process as far as the production of a strong aqueous solution of creosote is concerned. Such solutions may be used without further admixture or in a great many combinations with suitable chemicals.

I do not limit myself to the proportions above stated, nor to the particular apparatus specified as similar results can be obtained using any equivalent apparatus, and aqueous solutions of creosote of various degree of strength, but all of them many times stronger than any heretofore known in the art, can be produced by suitably varying the proportions of the ingredients herein specified.

I make a new and useful pharmaceutical preparation as follows: 10 grams of sodium hypophosphite together with 10 grams of iodide of sodium are dissolved in forty grams of distilled water. The resulting solution is added to the before obtained creosote solution with which it is thoroughly mixed by shaking. This mixture is passed through a filter.

I am aware that there are many medicinal preparations on the market having creosote as a base, but I am also aware that as creosote has heretofore been considered insoluble in water as far as obtaining any solutions of practical value is concerned, these preparations contain either so insignificant a proportion of creosote as to be almost worthless as remedial agents, or else are obtained by treating the creosote with ether or salt whereby it does not lose its causticity and therefore can only be administered in very small doses.

It is well known that of the many kinds of creosote used in the arts that obtained from beech wood is the best for pharmaceutical preparations, for which reason I have given it the preference, but for purposes of this invention I wish to include creosote obtained from any other kind of wood either directly from its tar or from pyroligneous acid made therefrom, as all of their varieties have heretofore been insoluble in water in practically useful proportions, and a number are used as adulterants of the beech wood product. The constitution of even genuine beech wood creosote varies in the amount of monophenols and it would seem impossible to get under the name of creosote a fixed medicament.

I claim:

1. The process of obtaining strong aqueous solutions of creosote which consists in mixing together creosote, glycerin and absolute alcohol, gradually pouring said mixture upon triturated carbonate of magnesia under constant agitation, producing an emulsion; adding however to this syrup of sugar dissolved in water, the said agitation being continued during said last addition and for not less than ten minutes thereafter, producing thereby a very strong aqueous solution of creosote.

2. The process of obtaining strong aqueous solutions of creosote which consists in mixing together under constant agitation, one hundred grams of creosote, one hundred grams of pure glycerin, and twenty grams of absolute alcohol, gradually pouring said mixture upon twenty grams of previously triturated carbonate of magnesia under constant agitation, and adding seven hundred grams of syrup of sugar dissolved in water to the aforesaid emulsion, the syrup having a density of twenty degrees of the standard Baumé saccharimeter, the said agitation being continued during said last addition and for not less than ten minutes thereafter producing an aqueous solution of creosote of not less than ten per centum in strength.

In testimony whereof I have affixed my signature, in presence of two witnesses.

DOMINGO LODIGIANI.

Witnesses:
PETRO BENÉRETRO,
FEDOR HIPOTAN.